United States Patent
Barkai (10) Patent No.: US 11,317,203 B2
(45) Date of Patent: Apr. 26, 2022

(54) SYSTEM FOR PREVENTING DISTORTION OF ORIGINAL INPUT SIGNAL

(71) Applicant: NUVOTON TECHNOLOGY CORPORATION, Hsin-chu (TW)

(72) Inventor: Ittai Barkai, Tel Aviv (IL)

(73) Assignee: NUVOTON TECHNOLOGY CORPORATION, Hsin-Chu (TW)

( * ) Notice: Subject to any disclaimer, the term of this patent is extended or adjusted under 35 U.S.C. 154(b) by 11 days.

(21) Appl. No.: 16/984,560

(22) Filed: Aug. 4, 2020

(65) Prior Publication Data
US 2022/0046356 A1 Feb. 10, 2022

(51) Int. Cl.
*H04R 3/04* (2006.01)
*G06F 3/16* (2006.01)
*H04B 3/04* (2006.01)

(52) U.S. Cl.
CPC ............... *H04R 3/04* (2013.01); *G06F 3/16* (2013.01); *H04B 3/04* (2013.01)

(58) Field of Classification Search
CPC .... H04R 3/04; H04R 2201/023; H04R 1/403; H04R 2217/03; H04R 25/405; H04R 29/001; H04R 3/12; H04R 5/04; H04R 2420/07; H04R 2460/01; H04R 25/356; H04R 25/505; H04R 19/04; H04R 1/028; H04R 1/04; H04R 1/1008; H04R 1/1016; H04R 1/1041; H04R 1/1083; H04R 1/222; H04R 1/2807; H04R 2205/024; H04R 2225/39; H04R 2225/41; H04R 25/305; H04R 25/353; H04R 25/453;
(Continued)

(56) References Cited

U.S. PATENT DOCUMENTS 4,701,953 A 10/1987 White
4,739,514 A 4/1988 Short et al.
(Continued)

FOREIGN PATENT DOCUMENTS

RU 2279758 C2 7/2006
RU 2284648 C2 9/2006
(Continued)

OTHER PUBLICATIONS

Giannoulis et al., "Digital dynamic range compressor design—A tutorial and analysis", Journal of the Audio Engineering Society, vol. 60, No. 6, pp. 399-408, Jun. 2012.
(Continued)

*Primary Examiner* — Akelaw Teshale
(74) *Attorney, Agent, or Firm* — Kligler & Associates Patent Attorneys Ltd (57) ABSTRACT

An audio processing apparatus includes a linear processing stage and control signal circuitry (CSC). The linear processing stage is configured to receive an input audio signal, and to linearly process the input audio signal based on a user-provided setting of the linear processing stage, so as to produce a linear stage output audio signal. The control signal circuitry (CSC), which is configured to (a) generate a control signal based on (i) the user-provided setting of the linear stage and (ii) a prespecified signal quality preserving criterion, and (b) control the linear stage output audio signal with the control signal, so as to produce a controlled audio signal, in compliance with the signal quality preserving criterion.

17 Claims, 3 Drawing Sheets

(58) Field of Classification Search
CPC .... H04R 25/502; H04R 25/55; H04R 25/554; H04R 25/558; H04R 25/75; H04R 3/00; H04R 3/002; H04R 5/02; H04R 5/033; H04R 9/06; H04R 1/1075; H04R 17/00; H04R 9/025; H04R 15/00; H04R 19/013; H04R 2307/023; H04R 2307/027; H04R 25/70; H04R 3/005; H04R 31/003; H04R 7/24; H04R 1/26; H04R 1/28; H04R 29/00; H04R 7/04; H04R 1/02; H04R 2430/01; H04R 2430/21; H04R 2201/403; H04R 2225/43; H04R 2410/05; H04R 2430/00; H04R 2499/11; H04R 27/00; H04R 1/30; H04R 2430/03; H04R 29/004; H04R 3/02; H04R 5/00; H04R 1/326; H04R 2203/12; H04R 2430/20; H04R 1/10; H04R 1/1091; H04R 1/2803; H04R 1/2819; H04R 1/2842; H04R 1/288; H04R 2201/10; H04R 2201/401; H04R 2205/022; H04R 2227/003; H04R 2460/11; H04R 2460/15; H04R 2499/13; H04R 2499/15; H04R 25/407; H04R 1/005; H04R 1/023; H04R 1/105; H04R 1/1058; H04R 1/22; H04R 1/2834; H04R 1/2888; H04R 1/323; H04R 1/345; H04R 19/005; H04R 19/016; H04R 19/02; H04R 2201/003; H04R 2201/02; H04R 2201/34; H04R 2201/405; H04R 2203/00; H04R 23/00; H04R 2307/025; H04R 2400/13; H04R 2420/01; H04R 2420/09; H04R 2460/13; H04R 25/00; H04R 25/43; H04R 29/006; H04R 31/00; H04R 9/063; H04R 1/08; H04R 1/20; H04R 1/227; H04R 1/2896; H04R 1/32; H04R 1/38; H04R 1/40; H04R 17/005; H04R 19/00; H04R 2201/107; H04R 2205/041; H04R 2207/00; H04R 2207/021; H04R 2225/023; H04R 2225/025; H04R 2225/51; H04R 2225/61; H04R 2227/005; H04R 23/02; H04R 2400/11; H04R 2410/07; H04R 2460/07; H04R 25/04; H04R 25/30; H04R 25/456; H04R 25/552; H04R 25/604; H04R 25/606; H04R 25/652; H04R 25/658; H04R 29/003; H04R 29/007; H04R 29/008; H04R 3/007; H04R 3/14; H04R 5/023; H04R 5/0335; H04R 7/122; H04R 7/14; H04R 9/02; H04R 9/022; H04R 9/046; H04R 9/047; G06F 3/16; H04B 3/04

See application file for complete search history.

(56) References Cited

U.S. PATENT DOCUMENTS

| | | | |
|---|---|---|---|
| 4,815,142 | A | 3/1989 | Imreh |
| 7,194,096 | B2 | 3/2007 | Graumann |
| 7,317,800 | B1 | 1/2008 | Vierthaler et al. |
| 7,415,064 | B2 | 8/2008 | Sivadas et al. |
| 8,275,152 | B2 * | 9/2012 | Smirnov ............... H03G 5/165 381/98 |
| 8,351,493 | B2 | 1/2013 | Shakiba et al. |
| 8,467,547 | B2 | 6/2013 | Breitschadel |
| 10,755,722 | B2 | 8/2020 | You |
| 2008/0235494 | A1 * | 9/2008 | Kamath ............... G10H 1/0066 712/35 |
| 2009/0080675 | A1 * | 3/2009 | Smirnov ............... H03G 5/165 381/98 |
| 2011/0110533 | A1 | 5/2011 | Choi et al. |
| 2012/0063614 | A1 | 3/2012 | Crockett et al. |
| 2012/0191462 | A1 | 7/2012 | Aoki et al. |
| 2015/0188602 | A1 | 7/2015 | Groh |
| 2015/0380005 | A1 | 12/2015 | Chesney |
| 2017/0006394 | A1 * | 1/2017 | Risberg ............... H04R 3/04 |
| 2017/0318389 | A1 * | 11/2017 | Bjork ............... H04R 3/04 |
| 2018/0139537 | A1 * | 5/2018 | Shi ............... G10L 21/02 |
| 2018/0166090 | A1 | 6/2018 | Tu et al. |
| 2018/0247633 | A1 | 8/2018 | Wu et al. |

FOREIGN PATENT DOCUMENTS

| | | |
|---|---|---|
| WO | 2006047600 A1 | 5/2006 |
| WO | 2007120453 A1 | 10/2007 |
| WO | 2008105070 A1 | 9/2008 |

OTHER PUBLICATIONS

Barkai, U.S. Appl. No. 16/813,874, filed Mar. 10, 2020.

* cited by examiner

SYSTEM FOR PREVENTING DISTORTION OF ORIGINAL INPUT SIGNAL

FIELD OF THE INVENTION

The present invention relates generally to processing of audio signals, and particularly to methods, systems and software for correction of audio signal distortions.

BACKGROUND OF THE INVENTION

Techniques for automatic adjustment of audio signals have been previously proposed in the patent literature. For example, U.S. Pat. No. 7,415,064 describes transmit amplitude independent adaptive equalizers that compensate for transmission losses in an input signal when the transmit signal amplitude is unknown. Several embodiments are provided, including an embodiment having an equalizer core, a variable gain amplifier, and a variable gain amplifier control loop.

As another embodiment, U.S. Pat. No. 8,351,493 describes a folding adaptive equalizer. The equalizer comprises an equalizer core and an automatic gain control loop. The equalizing transfer function of the equalizer core is modulated by one or more gain control signals generated by the automatic gain control loop and by a folding signal generated by the automatic gain control loop. Depending on the folding signal, the equalizer increases the high-frequency gain, by increasing either the high-bandwidth gain or the low-bandwidth gain of the transfer function of the equalizer core.

SUMMARY OF THE INVENTION

An embodiment of the present invention that is described hereinafter provides an audio processing apparatus including a linear processing stage and control signal circuitry (CSC). The linear processing stage is configured to receive an input audio signal, and to linearly process the input audio signal based on a user-provided setting of the linear processing stage, so as to produce a linear stage output audio signal. The control signal circuitry (CSC), which is configured to (a) generate a control signal based on (i) the user-provided setting of the linear stage and (ii) a prespecified signal quality preserving criterion, and (b) control the linear stage output audio signal with the control signal, so as to produce a controlled audio signal, in compliance with the signal quality preserving criterion.

In some embodiments, the apparatus further includes a nonlinear processing stage, which is configured to receive the controlled audio signal and to process the controlled audio signal in compliance with the signal quality preserving criterion, wherein the signal quality preserving criterion specifies a linearity to be met by the nonlinear processing stage.

In some embodiments, the linear processing stage includes a digital equalizer, wherein the user-provided setting of the linear stage includes a set of user-dialed gains of respective channels of the digital equalizer, and wherein the CSC is configured to identify a maximal gain among the user-dialed gains, and if the maximal gain exceeds a predefined threshold, to scale down a gain of the digital equalizer by a value that is a function of the maximal gain.

In an embodiment, the digital equalizer includes one of a two-pole-two-zeros filter and a bi-quadratic filter.

In some embodiments, the apparatus further includes a memory, and the prespecified signal quality preserving criterion is stored in the memory and the CSC is configured to upload the prespecified signal quality preserving criterion from the memory.

In an embodiment, the prespecified signal quality preserving criterion is represented as a decision table.

In another embodiment, wherein the linear processing stage includes a digital filter, and wherein the user-provided setting of the linear processing stage includes a setting of a gain of the filter.

In some embodiments, the signal quality preserving criterion specifies a gain that is not to be exceeded.

In some embodiments, the CSC is configured to control the linear stage output audio signal with the control signal by multiplying the linear stage output audio signal by the control signal.

There is additionally provided, in accordance with another embodiment of the present invention, a method including linearly processing an input audio signal by a linear processing stage based on a user-provided setting of the linear processing stage, so as to produce a linear stage output audio signal. A control signal is generated based on (i) the user-provided setting of the linear stage and (ii) a prespecified signal quality preserving criterion. The linear stage output audio signal is controlled with the control signal, so as to produce a controlled audio signal, in compliance with the signal quality preserving criterion.

The present invention will be more fully understood from the following detailed description of the embodiments thereof, taken together with the drawings in which:

DETAILED DESCRIPTION OF EMBODIMENTS

Overview

Manufacturers of consumer-grade audio systems, and in particular those fitted in mobile devices, face the challenge of balancing audio quality with cost. Many such digital audio systems use digital signal processing (DSP) techniques to compensate for physical limitations of the devices (e.g., to overcome distortions due to small plastic enclosures) and to improve the cost and/or size of an engineered product. In particular, manufacturers commonly use DSP solutions that combine linear algorithms (e.g., filters, a volume knob) and nonlinear algorithms (e.g., a dynamic range compressor, a dynamic range limiter). As a result, the overall response of such audio systems to an input signal may be nonlinear (e.g., threshold dependent).

While DSP solutions may, by performing nonlinearly, provide benefits to the audio performance (e.g., by maximizing loudspeaker output with an acceptable level of distortion), there are numerous commercial applications where purity of signal is extremely important, and therefore signal distortions must be avoided. Examples include active noise cancelation, audio applications such as acoustic echo cancelation, and voice detection such as speech recognition. To this end, in these applications, maintaining linearity of audio processing is crucial.

Commonly, linear input signals are characterized by their amplitudes being limited to a predefined linear dynamic range. Consider, for example, a scenario in which an input signal is linear over the predefined 16-bit range of signal amplitudes [−96,0] [dBFS], where FS denotes full scale. In this example, without loss of generality, maintaining a signal amplitude in the [−96,0] [dBFS] range ensures that signals are processed linearly by a DSP solution comprising a nonlinear stage, maintaining purity of the processed signal. By way of example, a linearity-maintain criterion may comprise limiting (in a linear way) signal amplitude to be no more than a nonlinear threshold value of 0 [dB].

Furthermore, regardless of whether the system comprises a nonlinear stage or not, human users (e.g., musicians and mixing/mastering engineers in the home, studio or field) often tend to equalize sound by emphasizing the "wanted" frequency zones rather than attenuating the "unwanted" frequency zones. The methodology of attenuating unwanted frequency zones is typically better than boosting the wanted frequency zones for the reason mentioned above (keeping away from distortion and none-linearities). Nevertheless, many users still find themselves boosting the wanted zones instead of attenuating the unwanted zones, for a simple reason—ease of use. It is easier for a human user to "focus" on a specific frequency zone and then dial-in a single parameter (or knob) then to "dial-out" all the other zones. For this reason, many acoustic engineers know that in theory attenuation of "unwanted frequency" is the preferred method, but fail to practice this methodology. The techniques described herein correct this problem, automatically. The user can "boost" the "wanted" zone and the other zones will be "attenuated" automatically, by using the same single dial.

Conflicting requirements form audio apparatus (e.g., with and without a non-linear stage), as described above, may cause a signal to be unintentionally distorted. For example, an audio engineer or other user may provide (e.g., dial) positive gain in an equalizer in a mistaken anticipation that this ensures a linear response. This scenario may be common, since, as noted above, low signal purity often leads manufacturers to incorporate nonlinear stages, of which the user is unaware, into some audio systems. However, the disclosed technique is also applicable for securing signal quality of standalone linear apparatus, as described above.

Embodiments of the present invention that are described hereinafter provide methods and apparatuses that automatically maintain signal quality. To this end, the disclosed techniques automatically compensate for user selection (e.g., dialing) of audio processing parameters of a given linear processing stage of an apparatus that maintain a controlled response to any input signal within a given linear dynamic range, (e.g., within [−96,0] [dBFS]). In an embodiment, an audio processing apparatus includes (a) a linear processing stage, configured to receive an input audio signal, and to linearly process the input audio signal based on a user-provided setting of the linear processing stage, so as to produce a linear stage output audio signal, and (b) control signal circuitry (CSC), which is configured to generate a control signal based on (i) the user-provided setting of the linear stage and (ii) a prespecified signal quality preserving criterion (e.g., output signal intensity to not exceed zero [dB]). The CSC controls the linear stage output audio signal with the control signal, so as to produce a controlled audio signal, in compliance with the signal quality preserving criterion.

In some embodiments, when the apparatus incorporates a nonlinear stage comprising a nonlinear processing stage, such nonlinear stage is configured to receive the controlled audio signal and to process the controlled audio signal in compliance with the signal quality preserving criterion, wherein the signal quality preserving criterion specifies a linearity to be met by the nonlinear processing stage.

For example, a user, thinking that the DSP technique used is a linear solution, may set a positive gain that drives the system into a nonlinear response. For example, dialing a positive gain G in an equalizer channel that receives an input signal with an amplitude lower than zero [dB], but higher than −G [dB], causes a subsequent nonlinear limiter stage to limit that signal to zero [dB]. This human mistake can occur in various cases, such as:

Tuning a consumer-grade audio product in its design cycle (e.g., in a PC, cellular phone, TV, soundbar).
Front-of-house system tuning for a live show.
Public announcement (PA) systems tuned to carry human speech.
Recording or mastering in a studio.
Setting an EQ or bass boost of consumer-grade electronics (e.g., in a cellular phone).

Some embodiments of the present invention, therefore, provide methods and apparatuses that automatically maintain a linear response to any input signal within a given linear dynamic range (e.g., within [−96,0] [dBFS]). The disclosed techniques automatically compensate for user selection (e.g., dialing) of audio processing parameters of a given linear processing stage of an apparatus that may subsequently cause a nonlinear processing stage to distort the signal. The described solutions are of low complexity, have low computational- and electrical-energy requirements, and therefore are very suitable for consumer-grade mobile devices.

In some embodiments, an audio-processing apparatus that includes a linear processing stage and a nonlinear processing stage is provided. The linear stage is configured to receive an input audio signal and, based on a user-provided setting, to linearly process the input audio signal so as to produce a linear stage output audio signal. The audio-processing apparatus further includes control signal circuitry (CSC) which is configured to (a) receive the user-provided setting (e.g., upload a decision table from a memory, the decision table comprising signal-linearity-preserving criteria for the user-provided (e.g., user-selected) setting) (b) generate a control signal based on (i) the user-provided setting of the linear stage and (ii) a prespecified signal linearity preserving criterion, and (c) control the linear stage output audio signal with the control signal, so as to produce a controlled audio signal. A nonlinear processing stage of the audio-processing apparatus is configured to receive the controlled (e.g., corrected) audio signal, and to process the controlled audio signal linearly, in compliance with the signal linearity preserving criterion.

In some embodiments of the disclosed invention, the CSC receives an indication of a change in the setting of the linear stage (e.g., a change in the dialing of a set of filters of an equalizer) and checks if the change will lead to a subsequent nonlinear stage and distort the signal. If this is the case, the CSC performs a corrective action to prevent such a nonlinear effect, so as to maintain signal purity.

In some embodiments, for example, the CSC receives an indication of a change in the gain setting of one or more filters, and modifies the system response according to the changed setting by outputting the control signal to a multiplier which multiplies the filtered signal by the control signal so as to maintain the signal amplitude equal to or less than 0 [dB]. In an embodiment, the processor uses the read signal-linearity-preserving criterion from the decision table and checks the maximal gain of the filters. If any filter is set to a value above a predefined threshold (e.g., to a positive gain), the CSC decreases the overall output gain (i.e., of all filters) by at least the same setting amount. Otherwise, the CSC does not decrease the gain.

This control signal (i.e., the amount of gain decrease in dB) is outputted into the multiplier. The resulting signal is therefore attenuated evenly across the audio spectrum, including, for example, filter channels for which the gain is already negative. Thus, the overall signal power (e.g., volume) is reduced, while preserving the original relative gains between channels and preventing undesired distortion. In this way, an engineer or user, unaware of a possible nonlinear processing step, can dial any gain, and the disclosed technique keeps the system always safe from nonlinear zones.

In another embodiment, the linear processing stage comprises a digital equalizer, and the user-provided setting of the linear stage includes a set of user-dialed gains of respective channels of the digital equalizer. The CSC is configured to identify a maximal gain among the user-dialed gains, and if the maximal gain is above a predefined threshold, scale down all the user-dialed gains by a value that is a function of the maximal gain.

By providing automatic audio input control systems and methods to automatically (e.g., without a need for user awareness) prevent audio signal distortion, the disclosed technique enables consumer-grade devices to run applications with high signal purity demands while maintaining low complexity with low computational and electrical-energy requirements.

Apparatus Description

As noted above, in some consumer devices, an input audio signal may generate distorted output due to a nonlinear DSP, which, in many cases, may be a desired artifact aimed at optimizing, for example, an output volume.

However, in some applications (e.g., machine-speech recognition), signal purity (e.g., linearity) is critical. To prevent distortion in such cases, a functionality is required, which, without the disclosed embodiments of the invention, would require either user awareness to an unpractical level, or a complicated and costly solution requiring high energy consumption.

Figure 1:
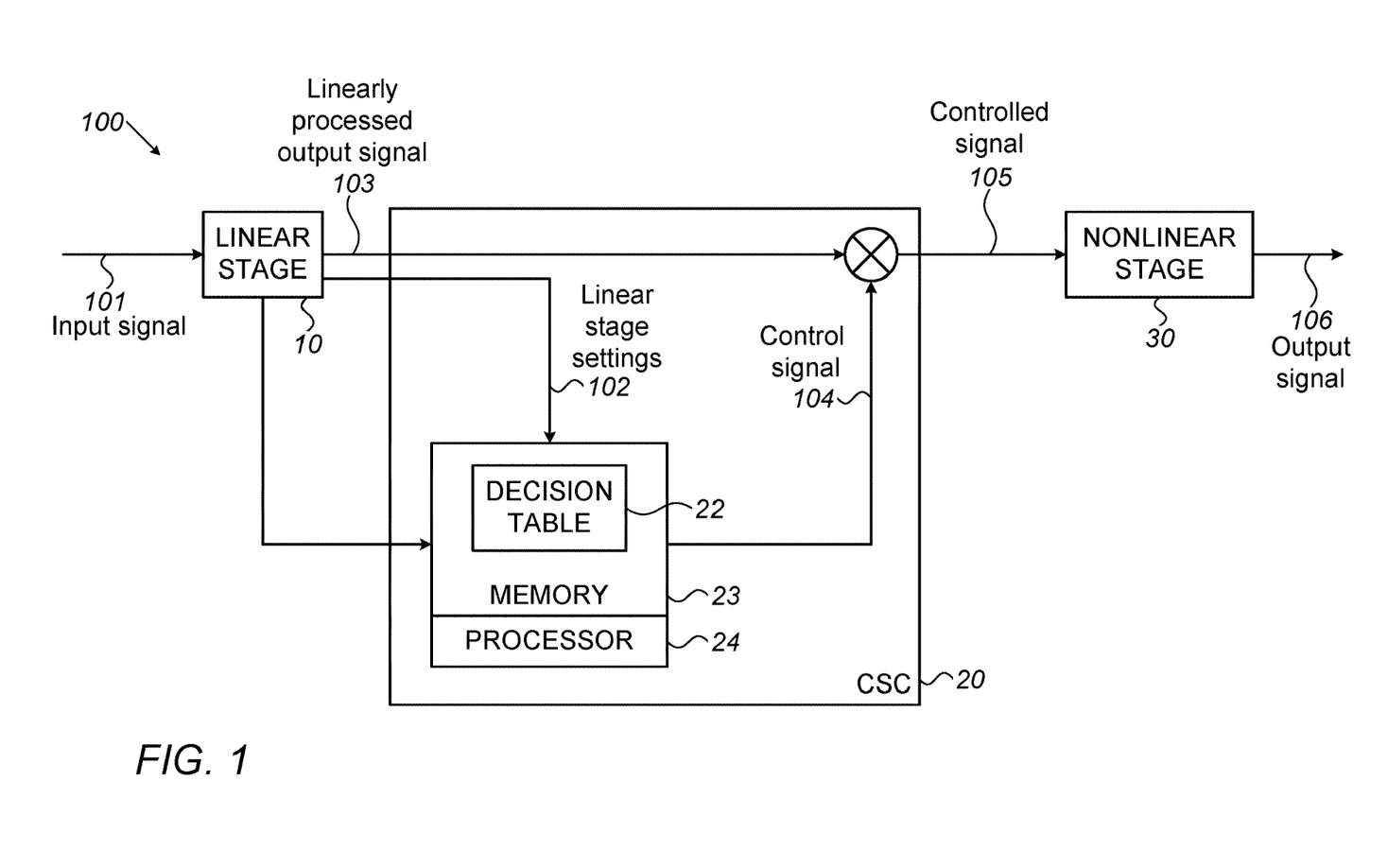
FIG. 1 is a block diagram schematically illustrating an audio processing apparatus comprising a linear processing stage, a nonlinear processing stage, and a control signal circuitry (CSC), in accordance with an embodiment of the present invention.

FIG. 1 is a block diagram schematically illustrating an audio processing apparatus 100 comprising a linear processing stage 10, a nonlinear processing stage 30, and a control signal circuitry (CSC) 20, in accordance with an embodiment of the present invention. Processing apparatus 100 may be used in any suitable system or device that outputs audio signals, e.g., mobile phone, computer, gaming console, or stereo system, to name only a few possibilities. In particular, apparatus 100 may be used in speech recognition applications.

Processing apparatus 100 has a feed-forward topology in which a linear stage 10 receives a linear audio signal 101 and generates a linear stage output signal 103. Linear stage 10 may comprise, for example, a set of linear digital filters (LDFs), usually 2p2z (two pole two zeros) filters, as a non-limiting example. Typically, such a set of filters are comprised in an equalizer unit (not shown). Output-signal 103 may therefore be an equalizer output signal. In some cases, stage 10 may include one or more digital biquad filters, which are a second order recursive linear filters, containing two poles and two zeros. "Biquad" is an abbreviation of "biquadratic", which refers to the fact that the transfer function of such filter is the ratio of two quadratic functions.

Figure 2A:
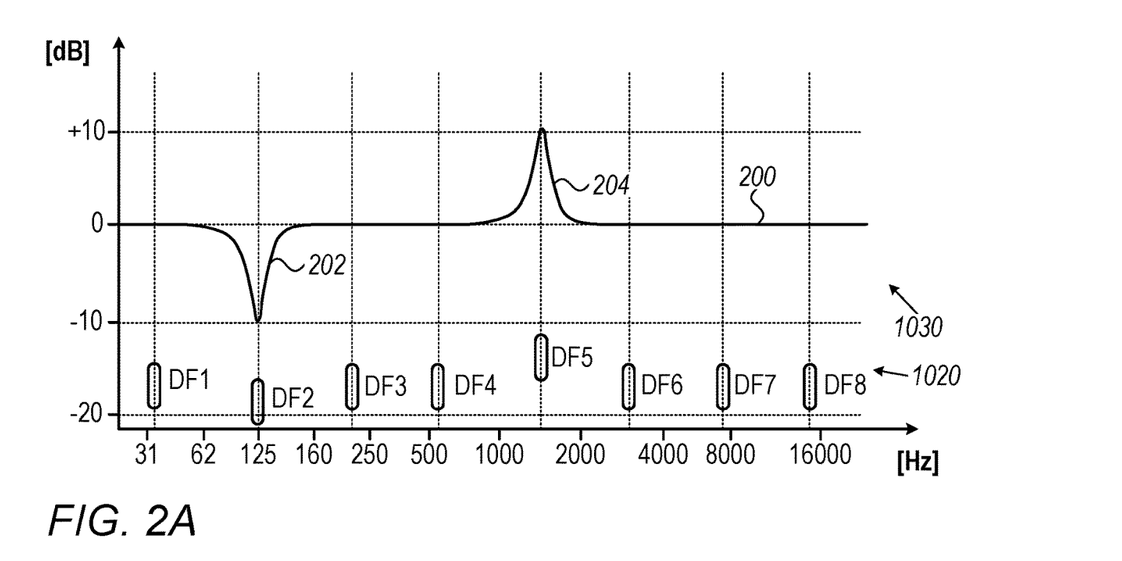
FIGS. 2A and 2B are graphs of a filter output signal and of a corrected signal, respectively, of audio processing apparatus of FIG. 1, in accordance with an embodiment of the present invention.
Figure 2B:
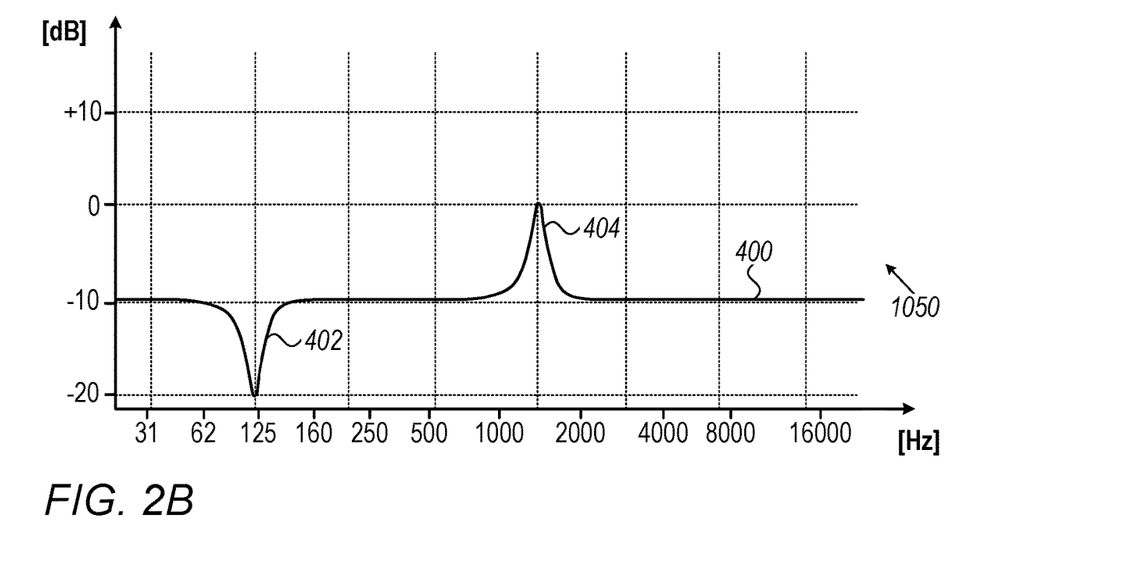

The linear stage settings 102 (e.g., a set of dialed filter gains) is inputted to CSC 20 which analyzes them responsively by comparing them to a prespecified signal-linearity-preserving criterion. Subsequently, CSC 20 calculates, generates, and outputs a control signal 104 that CSC 20 controls with (e.g., multiplies by) output signal 103. The application of control signal 104, e.g., using multiplier 25, generates a controlled audio signal 105 which is not nonlinearly affected by a subsequent nonlinear processing stage 30 which is itself configured to comply with a same signal-linearity-preserving criterion (e.g., not allowing a signal having a positive amplitude in [dB]). For example, the CSC prevents audio signal 105 from being above 0 dB at any frequency, so that a limiter type of nonlinear stage 30 does not distort the signal (i.e., producing an output signal 106 that is distorted) by nullifying signals above 0 dB, as shown in FIG. 2.

In more detail, CSC 20 comprises a memory 23 (or, in other embodiments, has access to a memory which is not part of CSC 20) in which a decision table 22, comprising the signal linearity preserving criteria, is stored. CSC 20 further comprises a processor 24 (or, in other embodiments, has access to a processor which is not part of CSC 20). The processor calculates a corrective gain coefficient 104 (the output of CSC 20) responsively to a received filter gain setting 102, and based on the signal-linearity-preserving criterion for filter gain incorporated in decision table 22 read by processor 24. CSC 20 applies gain coefficient 104 to uniformly attenuate signal 103. The corrected signal 105 is therefore not subsequently distorted by a non-linear stage that is a limiter, as described in FIG. 2.

The embodiment of FIG. 1 is depicted by way of example, and in a simplified way, for the sake of clarity. For example, another type of digital filter may be used by the disclosed technique, such as a single-pole filter, three-pole or any other number of pole filter, LPF, BPF of any order, finite impulse response (FIR) filter, etc. Additional elements of apparatus 100, such as other components of the equalizer unit, and audio amplification stages, are not described for clarity of presentation.

In various embodiments, the different elements of the audio processing apparatus shown in FIG. 1 may be implemented using suitable hardware, such as one or more discrete components, one or more Application-Specific Integrated Circuits (ASICs) and/or one or more Field-Programmable Gate Arrays (FPGAs). Some of the functions of the disclosed CSC 20 may be implemented in one or more general purpose processors programmed in software to carry out the functions described herein. The software may be downloaded to the processors in electronic form, over a network or from a host, for example, or it may, alternatively or additionally, be provided and/or stored on non-transitory tangible media, such as magnetic, optical, or electronic memory.

Equalizer Auto Gain Response for Preventing Distortion of Original Input Signal

Taking, by way of example, linear processing stage 10 to be an N-channel equalizer, a user may dial filter gains of N different filters of the N-channel equalizer by using knobs DF1-DFN of the equalizer.

At least one of the dialed gains is the highest, called hereinafter HighestGain. As noted above, assuming the common dynamic range [−96, 0] [dBFS], if HighestGain is a non-positive number, CSC 20 has no effect on the equalizer output signal (e.g., CSC outputs a control signal 104, OutGain, OutGain=0 [dB]). If, on the other hand, the user-dialed HighestGain is positive, i.e., $$\text{HighestGain} > 0, \qquad \text{Eq. 1}$$

then CSC 20 of apparatus 100 corrects all of the equalizer's N channel gains.

In this example, CSC calculates, generates, and outputs a duplicative control signal, OutGain, that is a function of the highest dialed gain. For example, $$\text{OutGain} = -(\text{HighestGain}) - \Delta, \qquad \text{Eq. 2}$$

where $\Delta \geq 0$ is a prespecified tolerance value, e.g., 1 (one) dB.

The above example is described in more detail in FIGS. 2A and 2B, which are graphs of a filter output signal 1030 and of a corrected signal 1050, respectively, of audio processing apparatus 100 of FIG. 1, in accordance with an embodiment of the present invention.

In the shown embodiment, a user dials (1020) filter gains of N=8 different filters of an 8-channel equalizer, using knobs DF1-DF8. One of the dialed gains (DF5) is the highest and positive, and thereby invokes the automatic correction performed using the disclosed technique.

In FIG. 2A the user amplifies a flat (200) zero [dB] signal by −10 dB at 125 Hz (the center frequency of DF2) to have a dip 202 therein, and by +10 dB at 1500 Hz (the center frequency of DF5) to a have a peak 204 therein. According to Eq. 1, such a user gain setting 1020 means a HighestGain=10 [dB].

As seen in FIG. 2B, a corrected signal 1050 amplitude at all frequencies is lower or equal to zero [dB], after CSC 20 evenly attenuates signal 1030 by 10 [dB]. Apparatus 100 achieves this by CSC 20 automatically correcting (e.g., compensating for) the user-dialed gains, according to Eq. 2, by outputting a multiplicative factor of −10 [dB] (using 4=0) that evenly (i.e., linearly) attenuates output signal 1030. Specifically, the flat signal 400 amplitude is −10 [dB], dip 402 amplitude at 125 Hz is −20 [dB] and peak 404 amplitude at 1500 Hz is zero [dB].

As a result, no portion of corrected signal 1050 is non-linearly processed, for example, by a limiter configured to clip positive signals to zero [dB].

In the above examples, the threshold is brought as a general example of zero [dBFS], that being the maximum level possible of a "low Dynamic range" part of the system, without clipping and distortion.

While this is the most common case, it is not necessarily the only one. Assuming that both the input and output of the system are restricted to a specific dynamic range and word length, in the common example, the word length is 16-bit (representing a system with ~96 dB of dynamic range, many times referred to as "CD quality"). A digital sound processor usually uses a higher dynamic range and longer word length. It is common for such contemporary DSP's to use 32-bit floating point core DSP architectures.

In this case, the DSP "receives" a signal which is limited to the 16-bit representation. This is regarded as ZERO [dBFS] (dB of Full scale) in which "FS" is in reference to the input and output (low dynamic range) zones of the full system. Within the DSP, the signal can be "beefed" up and pass that threshold of 0 [dBFS], hence, it is not really "Full Scale" for the higher dynamic range part of the system. This is commonly referred to as 'Zero dB'.

This above common case is a none limiting example. In other cases the threshold (above which the none-linear algorithms alters the signal) could be set to other values, i.e., not necessarily to ZERO [dBFS]. In other systems, the input and output might not be of the same dynamic range type, so the threshold (set to protect from output clipping) might not be the aforementioned "ZERO" [dBFS] (which is the maximum received from input).

It is therefore important to note that the broad case example of "ZERO" dB is brought here as a none limiting example and not as a strict rule.

Note that such systems might use "fixed point" input and output and "floating point" processing, in which the core processing might be with a much higher range than input/output. The application is not limited to specific architecture types (fixed point, floating point, 16-bit, 24-bit, 32-bit, etc.) or implementation and should cover both SW implementation (such as PC) as well as HW (DSP, ASIC, etc.). Such variety of cases might not be limited to a specific threshold (ZERO dB) but for any other.

Therefore, in this section, the signal linearity dynamic range is generalized to [A, B] [dBFS], where A and B are real numbers, where their values may or may not be in the vicinity of $A_0 = -96$ [dBFS] and $B_0 = 0$ [dBFS] to demonstrate how the disclosed invention can also handle linear signals within a non-standard dynamic range.

To demonstrate the flexibility of the disclosed apparatus, another implementation is provided, in which the disclosed apparatus maintains signal linearity for a nonstandard dynamic range of signal of [A, B], such as a 16-bit range of [A, B]=[−90, +6] [dB], or a 24-bit range of [A, B]=[−120, +24] [dB]. In this case Eq. 1 turns into HighestGain>C, with coefficient C being a function of B, such as C=−B. At a same time, Eq. 2 may remain the same, bringing the signal into the common linearity dynamic range of signal amplitudes [−96, 0] [dBFS]. Alternatively, if, for example, a subsequent nonlinear stage is known to operate at a nonstandard dynamic range, Eq. 2 may configure coefficient C to maintain the corrected signal within the nonstandard linearity range, so as to maintain its purity.

Joint Response for Multi Processors Overall Gain

In FIG. 2, the highest gain dialed into any one of the filters, or more generally, algorithms, triggers the system into the correct gain reduction.

However, real world cases may involve the works of few digital sound processors with a cumulative gain that is higher than that of a maximum of any of the single processor's gain. As a none limiting example, linear stage 10 of system 100 may provide a gain setting 102 comprising a gain of +3 dB, but at a very slightly different frequency compared to the frequency width of the signals (e.g., $f_1$=1000 Hz, and $f_2$=1100 Hz vs, a FWHM=1400 Hz of the two signals).

In this case, it is easy to see that the overall gain for an input frequency of ~1000 Hz will be approximately the cumulative +6 dB.

Choosing the maximum of the above two bands at will require the system to attenuate 3 dB and not the actually needed 6 dB approximately. As used herein, the terms "about" or "approximately" for any numerical values or ranges indicate a suitable dimensional tolerance that allows the part or collection of components to function for its intended purpose as described herein. More specifically, "about" or "approximately" may refer to the range of values ±20% of the recited value, e.g. "about 90%" may refer to the range of values from 71% to 99%.

Thus, to accurately account real-world cases, one the system has to consider a cumulative gain setting, if exists, from all algorithms, as an input of CSC 20. Methods of calculating the cumulative gain that may be used to replace setting 102 with a generalized overall setting are usually based on extracting the magnitude of the linear transfer function of each linear stage by means of a calculation based on their zeros and poles. These techniques are well known and out of the scope of this application.

Selective Auto Gain Response

In some embodiments, a designer would want to ensure that an SCS 20 unit is not unconditionally triggered by the highest gain setting of all the algorithms (e.g., of all gain setting of a linear stage at different frequencies). As an example, assume a bass boost algorithm has the highest gain setting. Still, this maximal value might not trigger a use of a criterion stored in the "decision table" or at least not to the same degree as the other EQ bands. SCS 20 may be configured, for example, to calculate a gain reduction based on non-bass frequencies only. It is very accepted in this industry for bass boost algorithm to provide some degree of distortion which is usually accepted and even favorited by the human brain, for low frequency notes. Such distortion might not be accepted for mid-range (voice) frequencies, so a system can be designed such as the bass-boost will not trigger the use of a criterion stored in the decision table (and send the full system into slight distortion due to the limiters action) while other algorithms (such as EQ bands) will trigger the use of a criterion stored in the "decision table" and force it to not trigger the limiter, but otherwise, lower then output volume and keep high purity of sound.

Any mix of decision factor and weights for different algorithms is still regarded as covered by the patent.

Method of Auto Gain Response for Preventing Distortion of Original Input Signal

Figure 3:
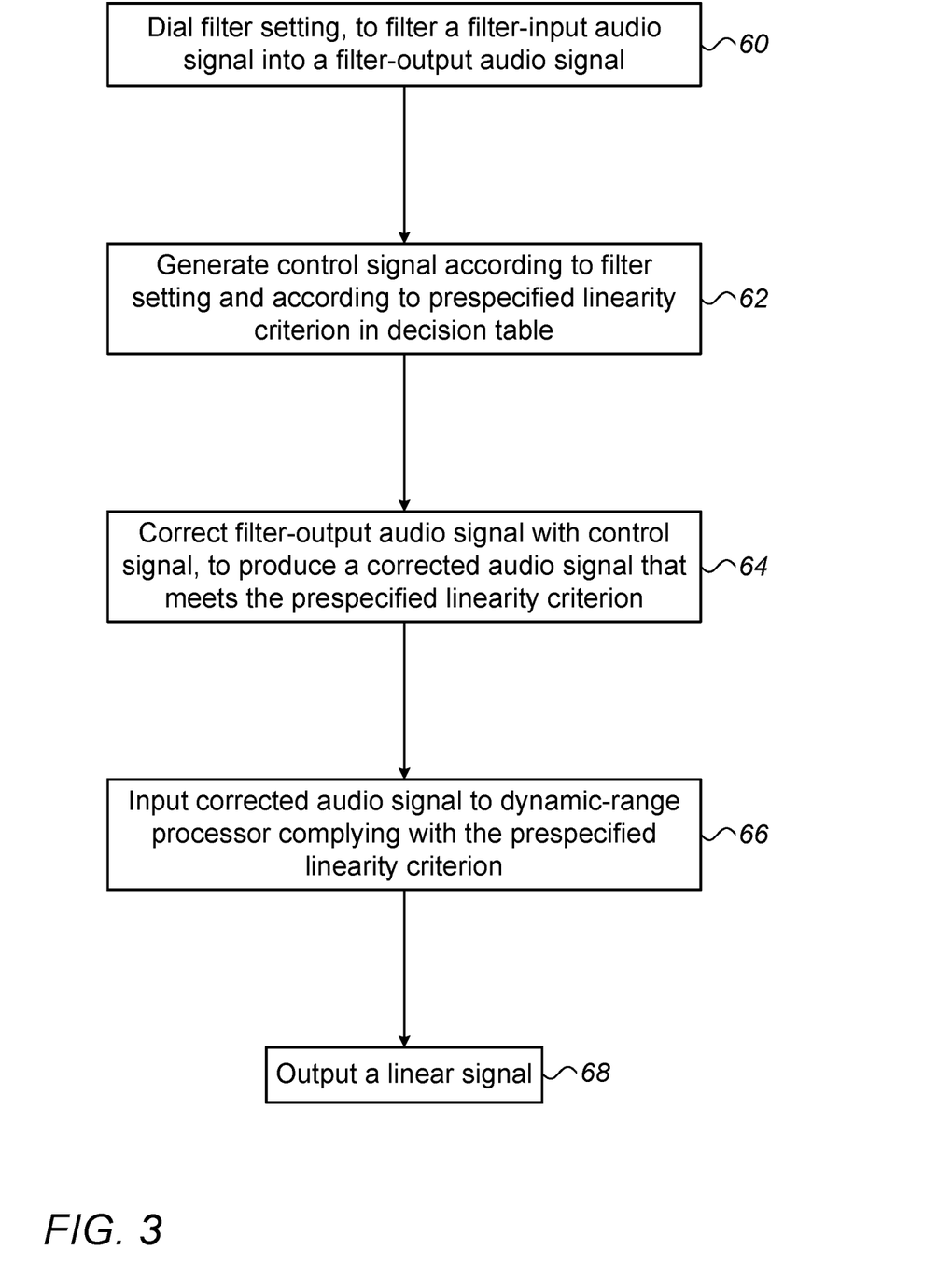
FIG. 3 is a flow chart that schematically illustrates a method for correcting an audio gain setting using the audio processing apparatus of FIG. 1, in accordance with an embodiment of the present invention.

FIG. 3 is a flow chart that schematically illustrates a method for correcting an audio gain setting (e.g., dialing) using audio processing apparatus 100 of FIG. 1, in accordance with an embodiment of the present invention.

The algorithm, according to the presented embodiment, carries out a process that begins with a user dialing a filter setting 102 (e.g., gain value) into linear stage 20 of apparatus 100 to linearly process (e.g., digitally filter) an input signal, at a signal linear processing step 60, so as to produce lineally processed output signal 103.

Next, CSC 20, which receives dialed setting 102, calculates and generates control signal 104 according to a prespecified signal-linearity-preserving criterion, at a control signal generation step 62.

In a signal correcting step 64, CSC 20 controls (e.g., multiplies) the control signal and the linearly processed output signal 103 to produce a corrected signal 105 that meets the prespecified signal-linearity-preserving criterion.

At a corrected signal outputting step 66, CSC 20 outputs corrected signal 105 that is received into a dynamic range processor (e.g., a limiter) type of nonlinear stage 30, that processes the signals in compliance with the prespecified signal-linearity-preserving criterion (i.e., linearly). Finally, at a signal outputting step 68, stage 30 outputs a linear signal 106.

Although the embodiments described herein mainly address audio processing for consumer grade devices, the methods and systems described herein can also be used in other applications, such as in audio engineering.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An audio processing apparatus, comprising:
a linear processing stage, configured to receive an input audio signal, and to linearly process the input audio signal based on a user-provided setting of the linear processing stage, so as to produce a linear stage output audio signal; and
control signal circuitry (CSC), which is configured to:
generate a control signal, which guarantees that the user-provided setting of the linear stage will not cause the linear stage output audio signal to violate a prespecified signal quality, based on (i) the user-provided setting of the linear stage and (ii) a definition of a dynamic range that, if met at all times by the linear stage output audio signal, guarantees the prespecified signal quality; and
control the linear stage output audio signal with the control signal, so as to produce a controlled audio signal in compliance with the prespecified signal quality.

2. The apparatus according to claim 1, and comprising a nonlinear processing stage, which is configured to receive the controlled audio signal and to process the controlled audio signal in compliance with the signal quality, wherein the signal quality specifies a linearity to be met by the nonlinear processing stage.

3. The apparatus according to claim 1, wherein the linear processing stage comprises a digital equalizer, wherein the user-provided setting of the linear stage comprises a set of user-dialed gains of respective channels of the digital equalizer, and wherein the CSC is configured to identify a maximal gain among the user-dialed gains, and if the maximal gain exceeds a predefined threshold, to scale down a gain of the digital equalizer by a value that is a function of the maximal gain.

4. The apparatus according to claim 3, wherein the digital equalizer comprises one of a two-pole-two-zeros filter and a bi-quadratic filter.

5. The apparatus according to claim 1, further comprising a memory, wherein the prespecified signal quality is stored in the memory and the CSC is configured to upload the prespecified signal quality from the memory.

6. The apparatus according to claim 1, wherein the prespecified signal quality is represented as a decision table.

7. The apparatus according to claim 1, wherein the linear processing stage comprises a digital filter, and wherein the user-provided setting of the linear processing stage comprises a setting of a gain of the filter.

8. The apparatus according to claim 1, wherein the definition of the dynamic range specifies a gain that is not to be exceeded.

9. The apparatus according to claim 1, wherein the CSC is configured to control the linear stage output audio signal with the control signal by multiplying the linear stage output audio signal by the control signal.

10. A method, comprising:
   linearly processing an input audio signal by a linear processing stage based on a user-provided setting of the linear processing stage, so as to produce a linear stage output audio signal;
   generating a control signal, which guarantees that the user-provided setting of the linear stage will not cause the linear stage output audio signal to violate a prespecified signal quality, based on (i) the user-provided setting of the linear stage and (ii) a definition of a dynamic range that, if met at all times by the linear stage output audio signal, guarantees the prespecified signal quality; and
   controlling the linear stage output audio signal with the control signal, so as to produce a controlled audio signal, in compliance with the prespecified signal quality.

11. The method according to claim 10, and comprising receiving the controlled audio signal in a nonlinear processing stage, and processing the controlled audio signal by the nonlinear processing stage in compliance with the signal quality, wherein the signal quality specifies a linearity to be met by the nonlinear processing stage.

12. The method according to claim 10, wherein the linear processing stage comprises a digital equalizer, wherein the user-provided setting of the linear stage comprises a set of user-dialed gains of respective channels of the digital equalizer, and wherein controlling the linear stage output comprises identifying a maximal gain among the user-dialed gains, and if the maximal gain exceeds a predefined threshold, scaling down a gain of the digital equalizer by a value that is a function of the maximal gain.

13. The method according to claim 10, further comprising storing the prespecified signal quality in a memory, and uploading the prespecified signal quality from the memory.

14. The method according to claim 13, wherein storing the prespecified signal quality comprises storing a decision table.

15. The method according to claim 10, wherein the linear processing stage comprises a digital filter, and wherein the user-provided setting of the linear processing stage comprises a setting of a gain of the filter.

16. The method according to claim 10, wherein the definition of the dynamic range specifies a gain not to be exceeded.

17. The method according to claim 10, wherein controlling the linear stage output audio signal with the control signal comprises multiplying the linear stage output audio signal by the control signal.

* * * * *